United States Patent
Dozier

(10) Patent No.: US 8,545,245 B2
(45) Date of Patent: Oct. 1, 2013

(54) ELECTRICAL BUSWAY PLUG-IN UNIT WITH IMPROVED RESTRAINT MECHANISM

(75) Inventor: Steven Wayne Dozier, Murfreesboro, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 139 days.

(21) Appl. No.: 13/323,923

(22) Filed: Dec. 13, 2011

(65) Prior Publication Data
US 2013/0149888 A1    Jun. 13, 2013

(51) Int. Cl.
*H01R 4/60* (2006.01)

(52) U.S. Cl.
USPC .......................................... 439/211; 439/361

(58) Field of Classification Search
USPC ................ 439/207–217; 200/51.2; 361/675
See application file for complete search history.

(56) References Cited

U.S. PATENT DOCUMENTS

| | | | | |
|---|---|---|---|---|
| 2,911,179 A | | 11/1959 | Hammerly | 248/339 |
| 3,048,672 A | * | 8/1962 | Cataldo et al. | 200/50.2 |
| 3,377,608 A | * | 4/1968 | Christensen et al. | 439/122 |
| 3,657,606 A | * | 4/1972 | Greger et al. | 439/213 |
| 4,308,437 A | * | 12/1981 | Takagi et al. | 200/50.12 |
| 4,781,330 A | * | 11/1988 | Atkins | 439/359 |
| 4,831,489 A | * | 5/1989 | Ozu et al. | 200/50.26 |
| 4,912,599 A | * | 3/1990 | Wittmer | 200/50.2 |
| 5,019,676 A | * | 5/1991 | Heckenkamp | 200/50.18 |
| 5,043,847 A | * | 8/1991 | Deinhardt et al. | 361/736 |
| 5,415,557 A | | 5/1995 | Chapman et al. | 439/142 |
| 5,657,200 A | | 8/1997 | Leach et al. | 361/668 |
| 6,359,225 B1 | | 3/2002 | West | 172/72 B |
| 7,311,538 B2 | | 12/2007 | West | 439/211 |
| 7,819,676 B1 | * | 10/2010 | Cardoso et al. | 439/115 |
| 7,909,663 B1 | | 3/2011 | Bouffet | 439/787 |
| 7,952,026 B2 | | 5/2011 | Ramsey | 174/68.2 |
| 7,955,097 B2 | | 6/2011 | O'Leary et al. | 439/114 |
| 8,054,606 B2 | * | 11/2011 | Morris et al. | 361/115 |
| 8,305,736 B2 | * | 11/2012 | Yee et al. | 361/617 |

OTHER PUBLICATIONS http://sea.siemens.com/step/pdfs/busway.pdf, 72 pages, dated prior to Apr. 27, 2012.
http://www.google.com/url?q=http://www.eaton.com/ecm/idcplg%3FIdcService%3DGE_T_FILE%26dID%3D397442&sa=U&ei=9iYwTvKYH8Pg0OGFtaSyAQ&yed=0CC8QFjAI&usg=AFQjCNHj=0qBmyBGBjUbR8W91ndt1XDoHQ, 2 pages, dated © 2010.
http://www.emersonnetworkpower.com/en-US/Products/ACPower/PowerDistribution/Documents/SL-20900.pdf, 8 pages, dated © 2010.

* cited by examiner

*Primary Examiner* — Briggitte R Hammond
(74) *Attorney, Agent, or Firm* — Nixon Peabody LLP

(57) ABSTRACT

An electrical busway plug-in unit includes a pair of restraint mechanisms extending through the housing of the plug-in unit for mechanically attaching the plug-in unit to the busway. Each restraint mechanism includes a rotatable shaft extending through the front wall of the housing, and a knob attached to the front end of the shaft, on the exterior side of the front wall of the housing, for manually rotating the shaft. A mechanical connector projects rearwardly from the rear wall of the housing and extends forwardly into the interior of the housing where the connector is coupled to the shaft so that rotational movement of the shaft in opposite directions moves the connector into and out of latching engagement with the busway.

12 Claims, 5 Drawing Sheets

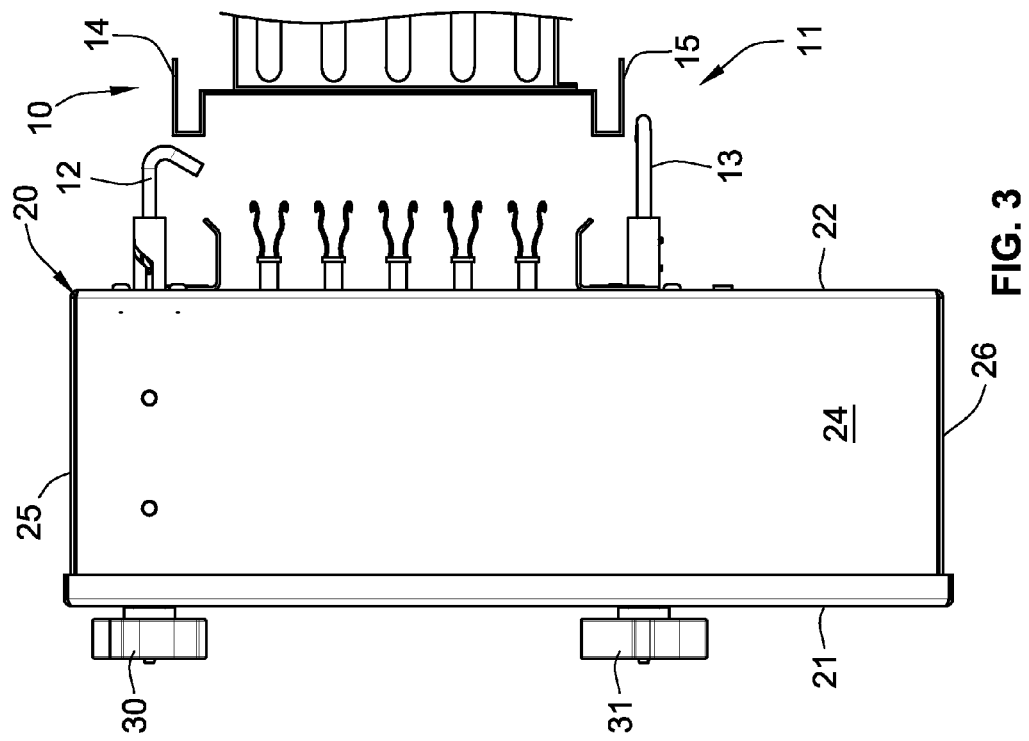
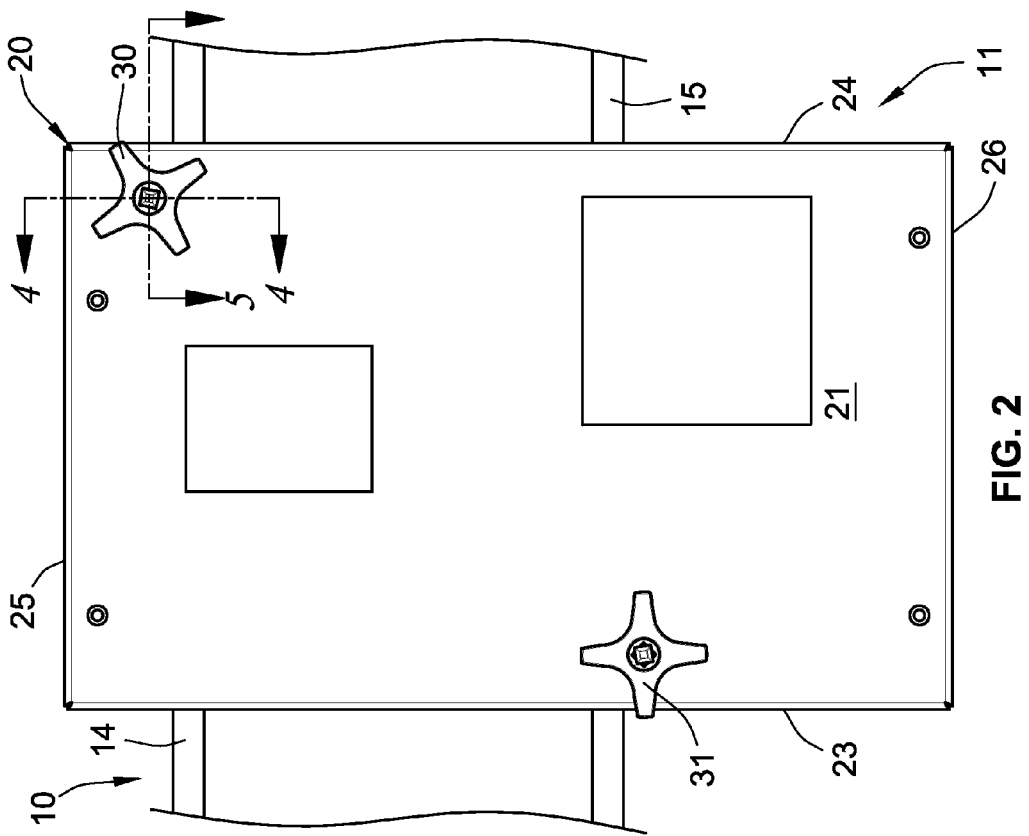

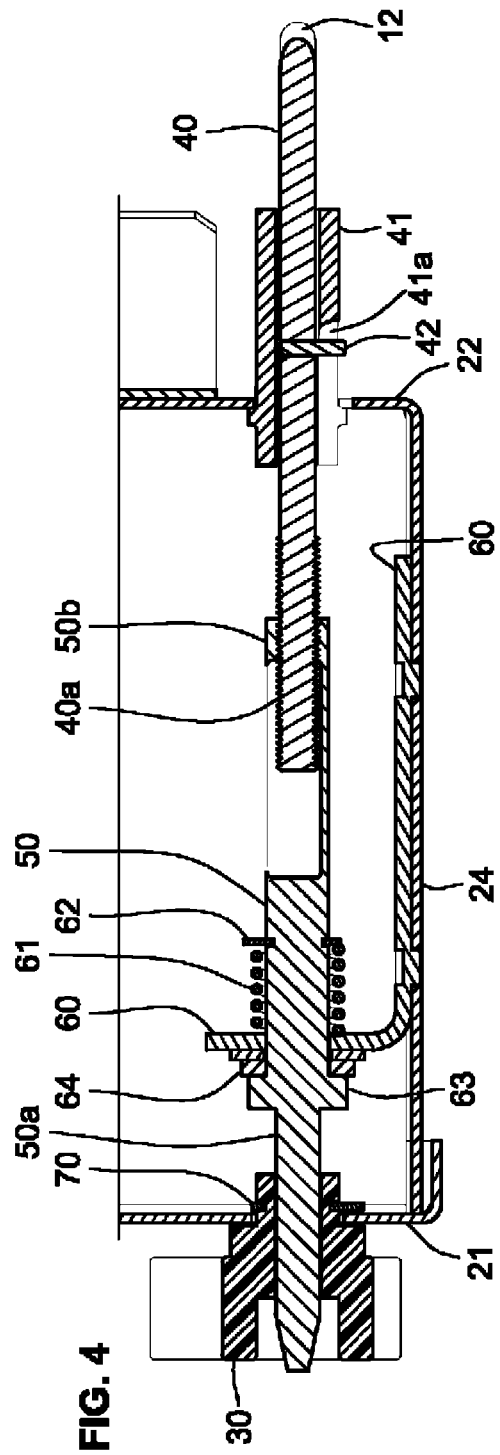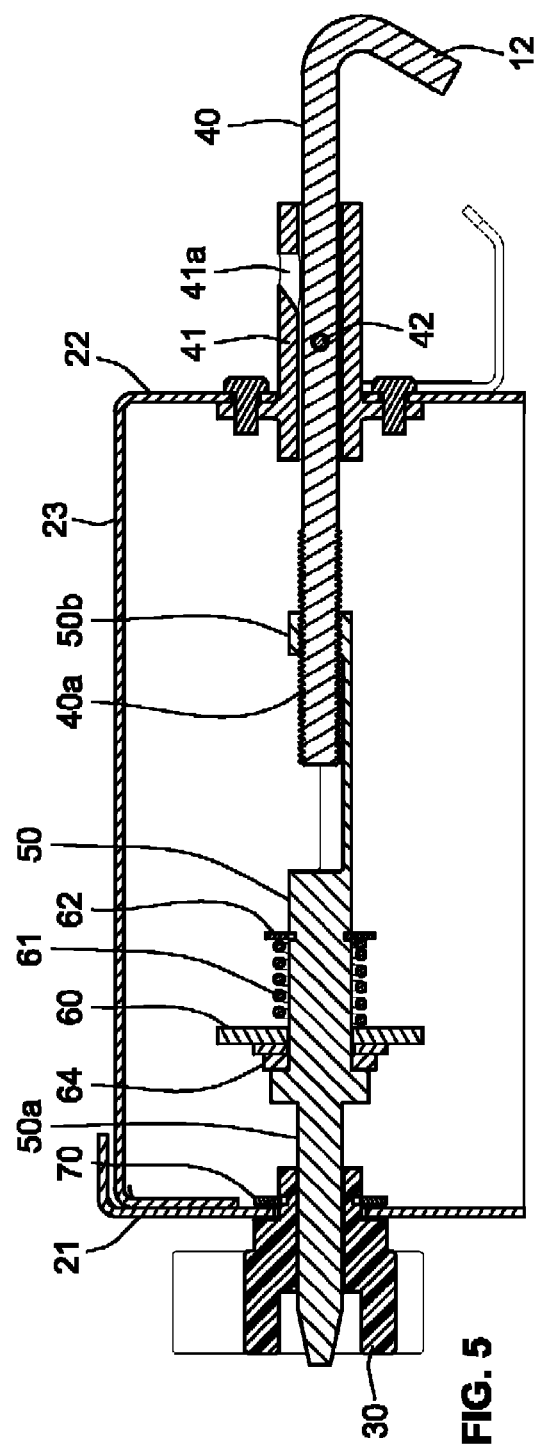

ELECTRICAL BUSWAY PLUG-IN UNIT WITH IMPROVED RESTRAINT MECHANISM

FIELD OF THE INVENTION

The present invention relates generally to plug-in units for electrical busways for electrical power distribution and, more particularly, to an improved restraint mechanism for such plug-in units.

BACKGROUND OF THE INVENTION

Busways for electrical distribution systems are commonly understood in the art to include multiple pre-assembled sections of a duct containing individually insulated, usually flat electrical conductors or busbars. The individual sections are designed to be easily connected, both electrically and mechanically, end-to-end to form any desired length. In a plug-in busway, at least some of the sections are equipped with built-in electrical receptacles adapted to receive plug-in units containing electrical equipment to be connected to the busway, such as circuit breakers and different kinds of switches and control devices. To ensure the integrity of the electrical connections between the plug-in units and the busway, and to protect the plug-in units, restraint devices are typically provided on the plug-in units to mechanically connect or fasten the plug-in units to the busway.

In many applications of plug-in electrical busways, there has been an increasing need to accommodate a high density of plug-in units along portions of the busways. Many plug-in units require working access between adjacent plug-in units because the mechanisms for attaching the plug-in units to the busway are located on the exterior surfaces of the side walls of the units and require access for manual adjustments during the installation process. These attachment mechanisms increase the overall envelope size of each plug-in unit, which in turn reduces the allowable density of plug-in units on the busway.

SUMMARY OF THE INVENTION

The present invention permits the density of plug-in units on electrical busways to be significantly increased by providing plug-in units with an improved restraint mechanism that extends through the body of the plug-in unit. This not only reduces the overall envelope size of each plug-in unit, but also permits the plug-in units to be installed closely adjacent each other on the busway with little or no space between adjacent units.

In one embodiment, the restraint mechanism does not require the use of any hand tools, and permits an installer to attach a plug-in unit to a busway by simply turning a pair of knobs on the front panel of the plug-in unit. Thus, the installation process is greatly simplified, which in turn reduces the time required to install each plug-in unit.

One implementation of the electrical busway plug-in unit includes a housing having front and rear walls with plug-in connectors projecting from the rear wall for engaging one of the receptacles in a plug-in electrical power distribution busway, and a pair of restraint mechanisms extending through the housing for attaching the housing to the busway. Each of the restraint mechanisms includes a rotatable shaft extending through the front wall and into the interior of the housing; a knob attached to the front end of the shaft, on the exterior side of the front wall, for manually rotating the shaft; and a mechanical connector projecting rearwardly from the rear wall and extending forwardly through the rear wall into the interior of the housing where the connector is coupled to the shaft so that rotational movement of the knob in opposite directions moves the connector into and out of latching engagement with the busway. The coupling of the connector to the shaft may convert rotational movement of the shaft to linear longitudinal movement of the connector, e.g., via a threaded connection between the shaft and the connector.

A guide mechanism may be coupled to the connector for converting a portion of the linear longitudinal movement of the connector to rotational movement of the connector to rotate the connector into and out of an overlapping relationship with a portion of the busway. In one implementation, the guide mechanism converts the linear longitudinal movement of the connector to and from its most extended position to 90° of rotational movement of the connector, to rotate the connector into and out of the overlapping relationship with the portion of the busway.

In one example, the connector includes an elongated rod extending into the housing, and the guide mechanism includes a guide pin attached to the rod and projecting laterally from the rod, and a guide sleeve affixed to the housing and forming a slot that receives the guide pin and controls the angular position of the pin, and thus the rod, in response to longitudinal movement of the rod.

The shaft and the rod are preferably mounted for limited longitudinal movement, with a biasing spring urging the shaft and rod rearwardly while permitting limited forward movement of the shaft and rod.

The front wall of the housing may be a detachable front panel, with the knob being secured to the front panel and slidably mounted on the shaft so that the knob can be removed from the shaft along with the front panel without affecting the securement of the plug-in unit to the housing.

BRIEF DESCRIPTION OF THE DRAWINGS

The foregoing and other advantages of the present disclosure will become apparent upon reading the following detailed description and upon reference to the drawings.

FIG. 2 is a front elevation of the plug-in unit shown in FIG. 1.

FIG. 3 is a side elevation of the plug-in unit shown in FIG. 1.

FIG. 4 is an enlarged section taken along line 4-4 in FIG. 2.

FIG. 5 is an enlarged section taken along line 5-5 in FIG. 2.

DETAILED DESCRIPTION OF THE ILLUSTRATED EMBODIMENTS

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Figure 1:
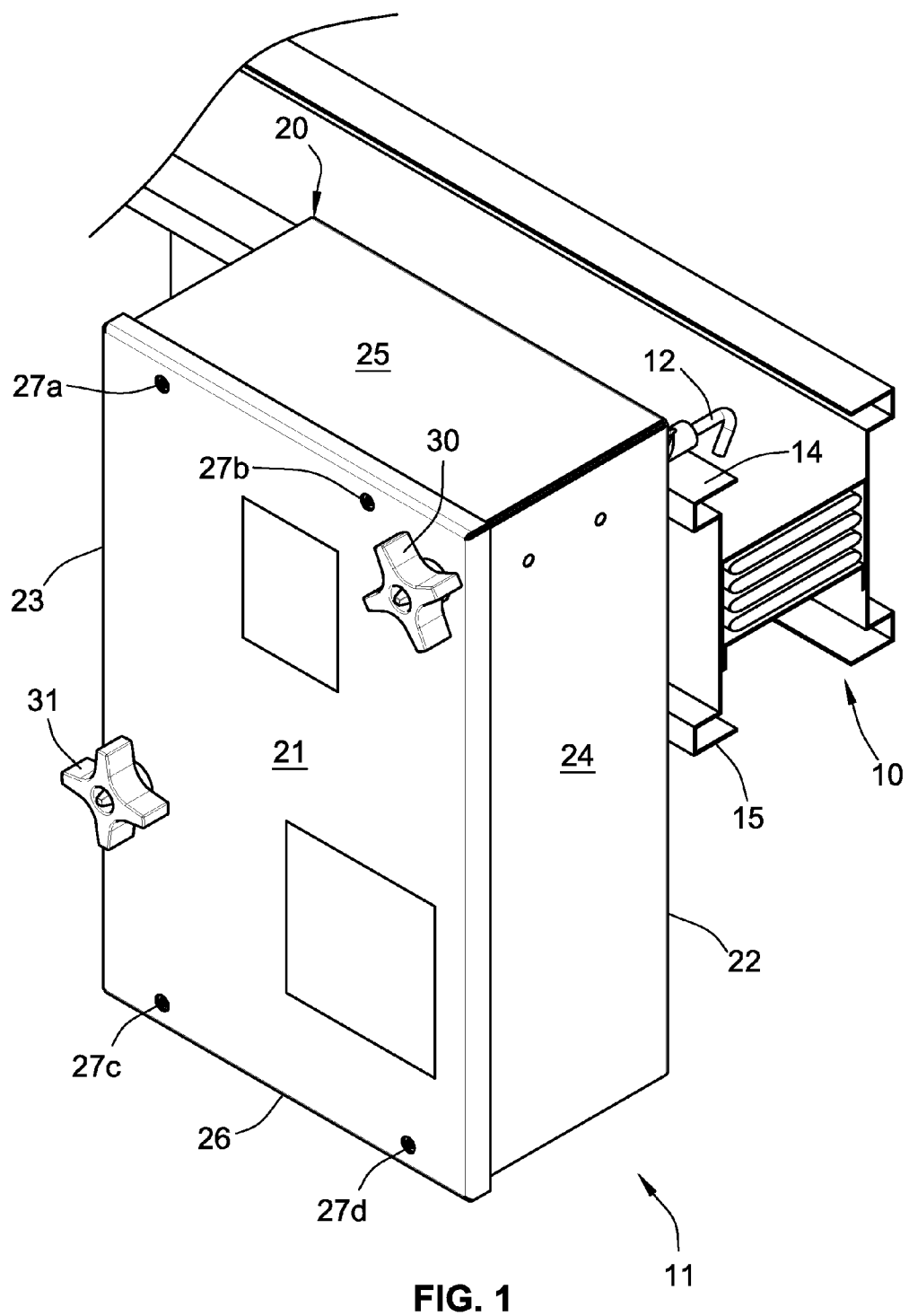
FIG. 1 is a front perspective of a plug-in unit for a plug-in electrical power distribution busway.
Figure 6:
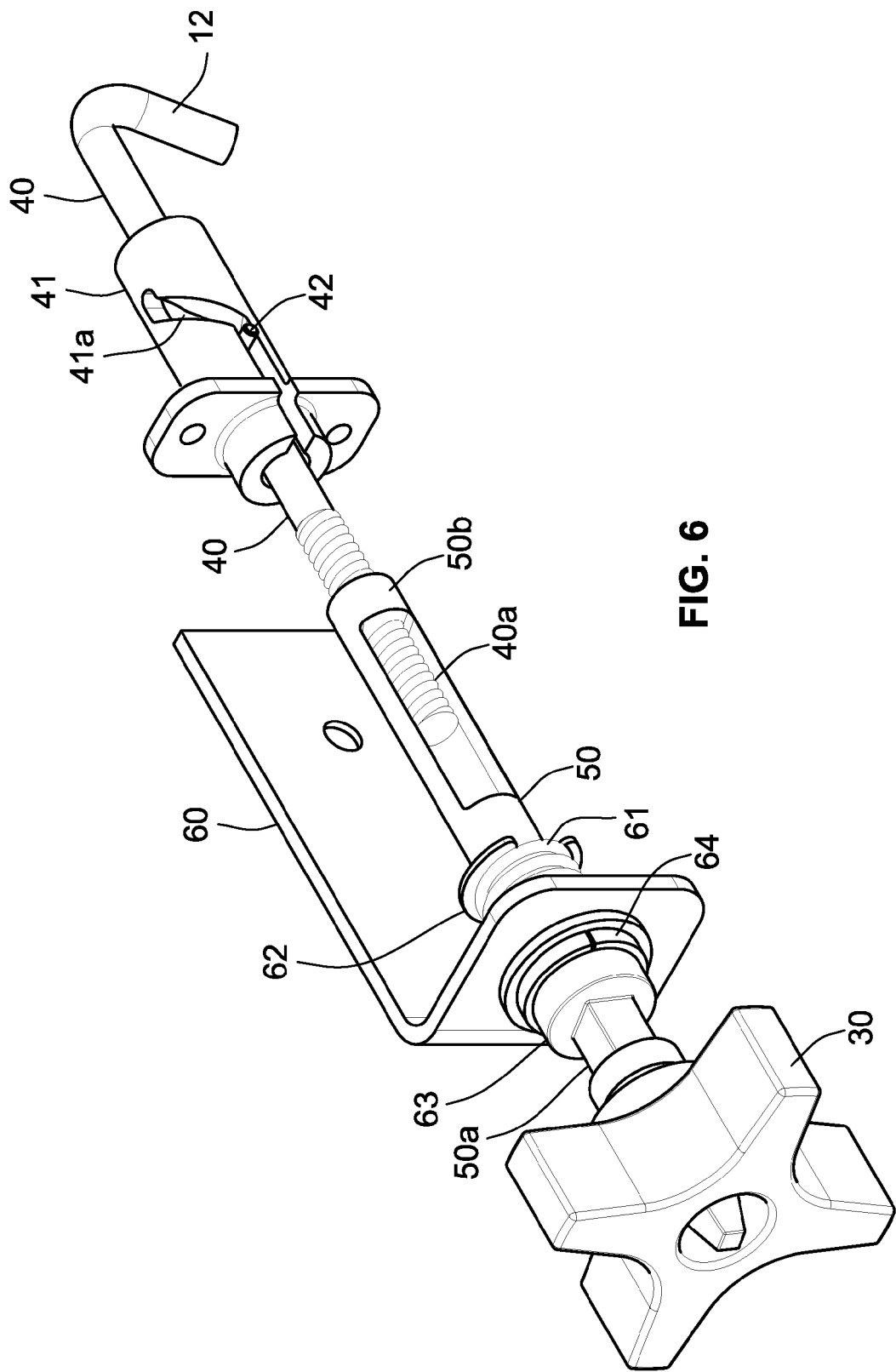
FIG. 6 is a further enlarged perspective of one of the restraint mechanisms in the plug-in unit shown in FIGS. 1-5.

Turning now to the drawings, FIG. 1 includes a partial illustration of a conventional plug-in electrical busway 10 for use in distributing electrical power and having a pair of outside flanged walls. This particular example is the "I-Line II" busway made and sold by Schneider Electric, but a variety of different busways are commercially available, both from Schneider Electric and from other manufacturers. One other example is the "Powerbus" plug-in busway made and sold by Schneider Electric, which has longitudinal flanges extending upwardly from the center of the top wall of the busway and downwardly from the center of the bottom wall.

A "plug-in" busway has built-in receptacles (not shown) located at intervals along the length of the busway for receiving matching electrical connectors or "stabs" projecting from a plug-in unit to be connected to the busway by plugging into one of the busway receptacles. One such plug-in unit 11 is shown in FIG. 1. In addition to the electrical connection via the stabs, the plug-in unit 11 is mechanically connected to the busway 10 by a pair of hooks 12 and 13 that overlap and engage outside flanges 14 and 15, respectively, on the busway 10.

The plug-in unit 11 includes a housing 20 containing electrical equipment to be connected to the busway 10. The housing 20 has a front wall 21, a rear wall 22, a pair of side walls 23 and 24, and top and bottom walls 25 and 26. The front wall 21 is detachable by removing four screws 27a-27d that are threaded into flanges or tabs on the top and bottom walls 25 and 26. As described in more detail below, the front wall can be detached without disconnecting or detaching the rest of the plug-in unit 11 from the busway 10.

Each of the two hooks 12 and 13 that mechanically fasten the plug-in unit 11 to the busway 10 is part of a restraint mechanism that is shown in more detail in FIGS. 4-7. Each restraint mechanism extends through the housing 20 for mechanically connecting the housing 20 to the busway 10. The front ends of the two restraint mechanisms terminate in knobs 30 and 31 that permit manually controlled manipulation of the hooks 12 and 13, respectively. The knobs 30 and 31 are located on the exterior side of the front wall 21.

The two restraint mechanisms are identical, so only the mechanism associated with the hook 12 will be described in detail. As can be seen in FIGS. 4 and 5, the hook 12 is formed by the rear end portion of an elongated rod 40 that extends forwardly through a guide mechanism for converting a portion of the linear longitudinal movement of the rod 40 to rotational movement of the rod 40 to rotate the hook 12 into and out of an overlapping relationship with a vertical flange (14, FIG. 1) of the busway 10. Specifically, the guide mechanism includes a guide sleeve 41 attached to the rear wall 22 of the plug-in unit 11, and a guide pin 42 projecting laterally from the rod 40 into a slot 41a in the guide sleeve 41. The guide mechanism formed by the slotted sleeve 41 and the guide pin 42 controls the angular position of the hook 12, around the axis of the rod 40, when the rod 40 is moved longitudinally, i.e., in the direction of the longitudinal axis of the rod 40.

Longitudinal movement of the rod 40 is effected by manually turning the knob 30 on the front wall 21 of the plug-in unit. The knob 30 has a square aperture that conforms to the square cross-sectional shape of the front portion 50a of a shaft 50 that extends through the knob 30 and the front wall 21 into the interior of the plug-in unit 11. The knob 30 is attached to the front end of the shaft 50, for manually rotating the shaft. The shaft 50 has an internally threaded bore in the rear end portion 50b of the shaft, so that it can be threaded onto a front end portion 40a of the rod 40 to convert rotational movement of the shaft 50 to linear longitudinal movement of the rod 40. Thus, as the shaft 50 is rotated by turning the knob 30, the threaded connection of the rear end portion 50a of the shaft 50 and the front end portion 40a of the rod 40 produces longitudinal movement of the rod 40. Both the magnitude and direction of the linear movement of the rod 40 correspond to the extent and direction of the rotational movement of the knob 30 and the shaft 50. Thus, rotational movement of the knob 30 in opposite directions moves the rod longitudinally in opposite direction, so that the connector hook 12 can be moved into and out of latching engagement with the busway 10.

Figure 7:
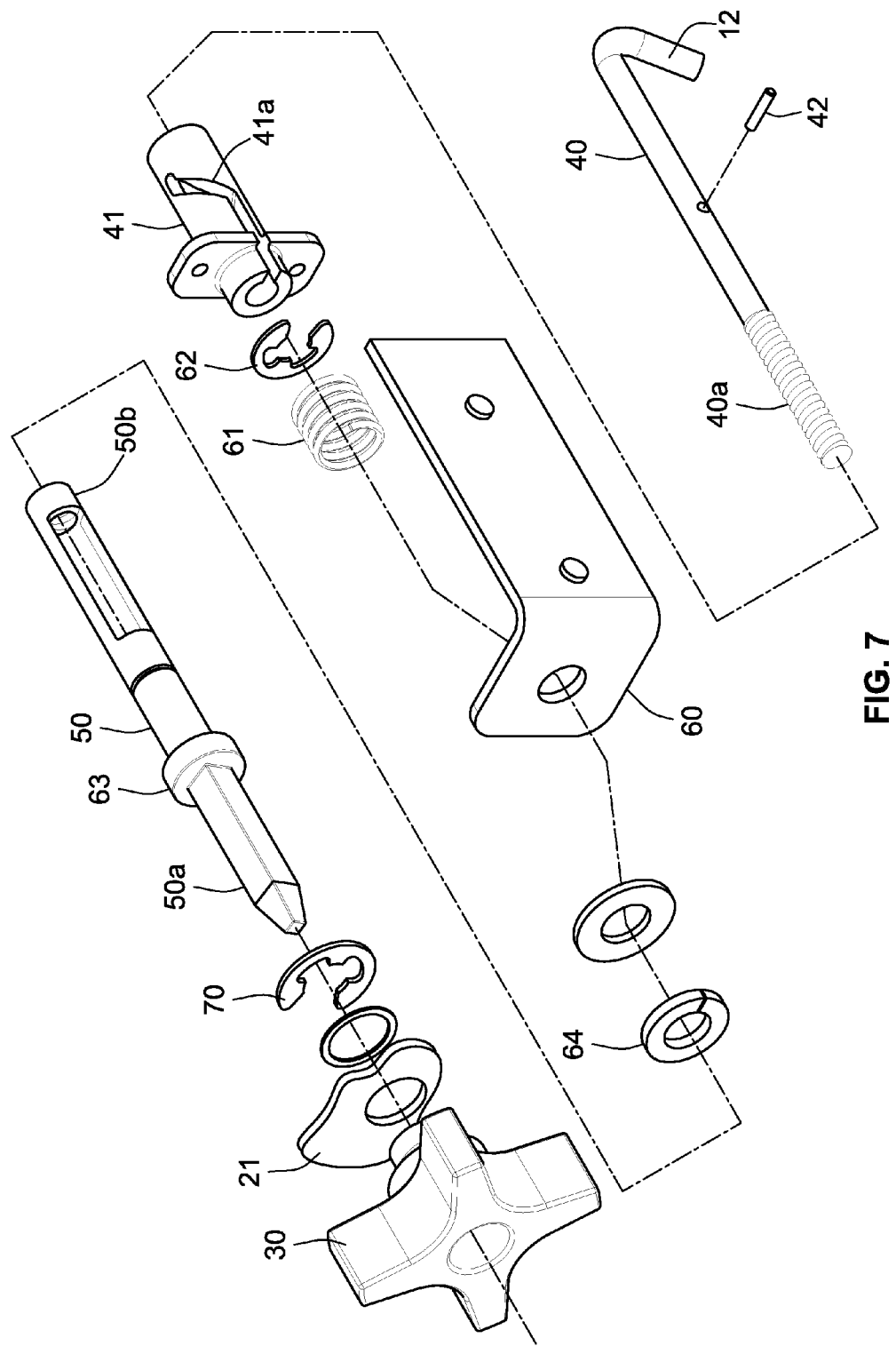
FIG. 7 is an exploded perspective of the restraint mechanism shown in FIG. 6.

The shape of the guide slot 41a in the guide sleeve 41, which is shown most clearly in FIG. 7, converts the linear longitudinal movement of the rod 40 to and from its most extended position to 90° of rotational movement of the connector, to rotate the hook 12 into and out of the overlapping relationship with the busway. It can be seen that the slot 41a is linear except for a rear end portion of the slot that extends around 90° of the circumference of the sleeve 41. When the guide pin 42 is at the rear end of the slot 41a, the hook 12 is in the horizontal position shown in FIG. 3. This permits the hook 12 to clear the bottom edge of the busway flange as the plug-in unit is plugged into the busway. Then, the initial linear movement of the rod 40, effected by the initial rotational movement of the knob 30, causes the side walls of the slot 41a to rotate the guide pin 42, and thus the rod 40, through an angle of 90° as the rod is retracted slightly into the interior of the plug-in unit. This 90° rotational movement turns the hook 12 from a horizontal position (as shown for the other hook 13 in FIG. 3) to its vertical position illustrated in FIG. 3. In this vertical position, the hook 12 overlaps the busway flange 14.

As rotation of the knob 30 continues, the guide pin 42 enters the straight portion of the guide slot 41a, which continues the retracting movement of the rod 40 without any further rotational movement of the hook 12. Thus, the hook 12 is maintained in its vertical position as the hook is drawn against the surface of the busway flange 14 by the retracting movement of the rod 40 and the hook 12. This retracting movement of the rod 40 is continued, by continuing to rotate the knob 30, until the hook 12 is pressed against the busway flange 14 with sufficient pressure to hold the plug-in unit 11 firmly against the busway 10. Because there are two restraint mechanisms, one controlling the hook 12 and the other controlling the hook 13, the retracting movements of the two hooks should be coordinated, alternating the retracting movements of the two hooks so that both hooks are initially brought into light engagement with their respective busway flanges, and then alternately increasing the pressure applied by the two hooks until the desired final pressure is achieved.

The restraint mechanism is rotatably supported within the interior of the plug-in unit 11 by a support bracket 60 attached to one of the side walls of the housing. The shaft 50 extends through an aperture in the support bracket 60, and a biasing spring 61 is captured between the bracket 60 and an E clip 62 on the shaft 50 to urge the shaft and rod rearwardly while permitting limited forward movement of the shaft and rod. Specifically, the compressed coil spring 61 biases the shaft 50 toward the rear of the plug-in unit 11, urging a flange 63 on the shaft 50 against a split washer 64 on the front side of the bracket 60. The spring 61 enables the hook 12 to retract, by compressing the spring 61, in the event that the hook 12 is pushed against an obstruction, such as another plug-in unit on the opposite side of the busway, while the plug-in unit carrying the hook 12 is being plugged in. Then when the hook 12 is dis-engaged from the obstruction, the spring 61 expands again to return the hook 12 to its normal extended position.

As can be seen in FIGS. 4 and 5, the front wall 21 of the housing in the illustrative embodiment is in the form of a detachable panel that can be removed by removing the four screws 27a-27d. The knob 30 is slidably mounted on the shaft 50 so that the knob can be removed from the shaft 50 along with the front panel. The knob 30 is secured to the front panel by an E clip 70 (see FIGS. 4 and 5) that fits into a groove in the hub of the knob 30, directly adjacent the inside surface of the front panel. To remove the front panel from the plug-in unit 11, after the four screws 27a-27d have been removed, the front panel is pulled forward to slide the knobs 30 and 31 off the front ends of their respective shafts 50. This arrangement permits the front panel to be removed without disturbing either the electrical or mechanical connections between the plug-in unit and the busway.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. An electrical busway plug-in unit comprising
   a housing containing electrical equipment to be connected to an electrical power distribution busway having receptacles for plug-in units, said housing including front and rear walls and having plug-in connectors projecting from said rear wall for engaging one of said receptacles in said busway, and
   a pair of restraint mechanisms extending through said housing for attaching said housing to said busway, each of said restraint mechanism including
   a rotatable shaft extending through said front wall and into the interior of said housing, and
   a mechanical connector projecting rearwardly from said rear wall and extending forwardly through said rear wall into the interior of said housing, said connector being coupled to said shaft so that rotational movement of said shaft in opposite directions moves said connector into and out of latching engagement with said busway.

2. The electrical busway plug-in unit of claim 1 which includes a knob attached to the front end of said shaft, on the exterior side of said front wall, for manually rotating said shaft.

3. The electrical busway plug-in unit of claim 1 in which said coupling of said connector to said shaft converts rotational movement of said shaft to linear longitudinal movement of said connector.

4. The electrical busway plug-in unit of claim 3 in which said coupling comprises a threaded connection between said shaft and said connector.

5. The electrical busway plug-in unit of claim 3 which includes a guide mechanism coupled to said connector for converting a portion of said linear longitudinal movement of said connector to rotational movement of said connector to rotate said connector into and out of an overlapping relationship with a portion of said busway.

6. The electrical busway plug-in unit of claim 5 in which said guide mechanism converts the linear longitudinal movement of said connector to and from its most extended position to 90° of rotational movement of said connector, to rotate said connector into and out of said overlapping relationship with said portion of said busway.

7. The electrical busway plug-in unit of claim 1 in which said mechanical connector includes an elongated rod extending into said housing, and said guide mechanism includes a guide pin attached to said rod and projecting laterally from said rod, and a guide sleeve affixed to said housing and forming a slot that receives said guide pin and controls the angular position of said pin, and thus said rod, in response to longitudinal movement of said rod.

8. The electrical busway plug-in unit of claim 7 in which said shaft and said rod are mounted for limited longitudinal movement, and which includes a biasing spring urging said shaft and rod rearwardly while permitting limited forward movement of said shaft and rod.

9. The electrical busway plug-in unit of claim 1 which includes a support bracket attached to said housing and rotatably supporting said shaft within the interior of said housing.

10. The electrical busway plug-in unit of claim 2 in which said front wall is a detachable front panel, and said knob is secured to said front panel and is slidably mounted on said shaft so that said knob can be removed from said shaft along with said front panel.

11. The electrical busway plug-in unit of claim 1 in which said connector includes a hook on the rear end of said connector for latching engagement with said busway.

12. The electrical busway plug-in unit of claim 7 in which said elongated rod includes a hook on the rear end of said rod for latching engagement with said busway.

\* \* \* \* \*